United States Patent [19]

Smith

[11] Patent Number: 5,395,534
[45] Date of Patent: Mar. 7, 1995

[54] WATER FILTRATION MEDIUM AND METHOD OF USE

[75] Inventor: James K. Smith, Baton Rouge, La.

[73] Assignee: Sterling Air & Water Corporation, Covington, La.

[21] Appl. No.: 969,993

[22] Filed: Nov. 2, 1992

[51] Int. Cl.$^6$ ............................................. C02F 1/28
[52] U.S. Cl. .................................. 210/688; 210/282; 210/912; 210/681; 423/605
[58] Field of Search .............. 210/688, 209, 282, 681, 210/502.1, 503, 510.1, 683, 912; 423/605; 204/96, 105 M; 428/566

[56] References Cited

U.S. PATENT DOCUMENTS

| | | | |
|---|---|---|---|
| 3,442,802 | 5/1969 | Hamilton et al. | 210/763 |
| 3,931,003 | 1/1976 | Jorgensen | 210/669 |
| 4,006,217 | 2/1977 | Faber et al. | 423/605 |
| 4,338,288 | 7/1982 | Rollmann | 210/688 |
| 4,551,254 | 11/1985 | Imada et al. | 210/688 |
| 4,881,219 | 4/1986 | Imada et al. | 423/605 |
| 5,078,889 | 1/1992 | Higgins et al. | 210/688 |
| 5,082,570 | 1/1992 | Higgins et al. | 210/688 |
| 5,130,051 | 7/1992 | Falk | 210/720 |
| 5,154,769 | 10/1992 | Kuske | 423/605 |
| 5,156,934 | 10/1992 | Kainthia et al. | 423/605 |
| 5,277,890 | 1/1994 | Wang et al. | 423/605 |

OTHER PUBLICATIONS

Prasad et al., "Development of Filtration/Adsorption Media for Removal of Bacteria and Turbidity from Water," pp. 67–71, 1989.

Posselt et al., "Cation Sorption on Colloidal Hydrous Manganese Dioxide", pp. 1087–1093, Dec. 1968.

*Primary Examiner*—Cynthia L. Nessler
*Attorney, Agent, or Firm*—Arnold, White & Durkee

[57] ABSTRACT

Disclosed is a water filtration medium capable of removing heavy metals from ground water and surface supplies. This medium comprises a gamma form of manganese dioxide that has been comminuted and divided into fractions according to mesh size, including fractions of 10 to 40 mesh, 40 to 100 mesh, and 100 to 325 mesh. The particles in a given mesh size are treated with a reducing agent such as ferrous sulfate and then washed with water to remove iron precipitates and fines. The washed particles are treated with a solution of sodium hydrosulfite and sodium bisulfite. The treated particles are then neutralized with sodium hydroxide to remove remaining acidity. The neutralized particles are washed again in order to remove spent chemicals and undissolved metals. The particles are then dried prior to use as a filtration medium. Also disclosed is a disposable cartridge for housing the filtration medium, a method of using the medium, and a means for preparing the medium.

34 Claims, 1 Drawing Sheet

WATER FILTRATION MEDIUM AND METHOD OF USE

BACKGROUND OF THE INVENTION

1. Field of the Invention

This invention relates to a fluid filtration system for use in purifying water derived from ground water and surface supplies. More specifically, the invention pertains to a water filtration medium comprising comminuted manganese dioxide particles which have been treated with ferrous ions, as well as methods of making and using the medium.

2. Description of the Related Art

Water derived from ground water and surface supplies has always been "contaminated" with naturally occurring materials, such as hydrogen sulfide, iron, manganese, and certain naturally occurring heavy metals derived from the elemental content of the earth and from various biological reactions that occur. More recently these same contaminants, and many more, have been introduced into these sources of water by mining and industrial activities. For example, industrial waste solutions have introduced several heavy metal contaminants into potential sources for drinking water. Various effluents from nuclear processing plants have introduced, for example, uranium, radium, cobalt, barium, strontium and similar ions. Certain of these contaminants are also from naturally occurring sources. This increasing burden of contaminants, and a growing knowledge of the problems they produce, has gradually led to increases in the restrictions concerning the maximum levels of these contaminants at the "point of use" of the water. The Environmental Protection Agency has established the maximum acceptable concentration of these contaminants in drinking water, as listed in Table I.

Probably the most common medium for the treatment of water to reduce various contaminants is an ion exchange resin. Depending upon the ions involved, this can be an anionic resin, a cationic resin or even a mixed resin medium. Generally, the resin beds are not selective as to the ions absorbed. The treatment process typically involves a regenerative bed where the absorbed ions are removed so as to condition the resin for additional removal. However, with some of the above-described contaminants, ion exchangers lack any appreciable affinity or lack the necessary selectivity to remove only the trace impurities.

TABLE I

| EPA DRINKING WATER STANDARDS | | |
|---|---|---|
| PARAMETER | MAXIMUM LEVEL | MAXIMUM LEVEL mg/l |
| Arsenic | | 0.05 |
| Barium | | 2.0 |
| Cadmium | | 0.05 |
| Chromium | | 0.10 |
| Copper | | 1.3 (action level) |
| Iron | | 0.3 |
| Lead | | 0.015 (action level) |
| Manganese | | 0.05 |
| Mercury | | 0.002 |
| Selenium | | 0.05 |
| Silver | | 0.05 |
| Sulfide (Odor Threshold) | | 0.025 |
| Radium | 5 pCi/l | 0.01 |
| Gross Alpha | 15 pCi/l | |
| Gross Beta | 4 millirem/yr | |
| Turbidity | 1/TU | |
| Coliform Bacteria | 1/100 ml | |

There are certain organic and inorganic adsorbents that have been utilized in water treatment in the past. One such organic adsorbent is granulated activated carbon. While carbon has exceptional removal capabilities for chlorine and certain organic contaminants, carbon beds lack usefulness for most heavy metals and are usually used in combination with some other treatment method. Bacterial growth is also very prevalent within the carbon bed.

Various zeolite are known for their selective affinities for certain metal ions. For example, "Greensand" (Ionac M-50 available from Sybron Corp.) is a zeolite that has been treated with potassium permanganate to impregnate the surface with a layer of the higher oxidative oxides of manganese. This material has been used specifically for the oxidation and filtration of sulfide, iron and manganese. It has a limited capacity due to having only a surface coating of active material before "breakthrough" occurs, so must be frequently regenerated. When the media is "exhausted", it must be regenerated with more permanganate.

Two other materials having possible use in water treatment are KDF-55D (available from KDF Fluid Treatments) and BIRM (available from Clack, Inc.). Both of these are very limited in performance and design options for the treatment of water sources with a variety of contaminants.

U.S. Pat. Nos. 4,551,254 and 4,581,219 describe a process in which powdered electrolytic manganese dioxide (EMD) of a certain type is immersed in an acidic solution of divalent manganese ions for several days. The mass that results is broken into pieces, classified to have a size of 20 to 48 mesh and neutralized. The patent states that this results in a packing that has high surface activity and macroscopic pores through which water is able to pass readily. The initial powder is said have microscopic porosity and is of gamma form. After processing the manganese dioxide is converted, according to the patent, into the beta form (or a mixture of the gamma and beta form). The macroporous nature of this product provides primarily filtration and not a catalytic or oxidation reaction to retain the contaminants. The patents report that the product was studied for the removal of low levels of manganese, iron and primarily chromaticity (colored matter) from lakes or rivers. Contact times reported in these references were about 2.5 minutes.

Japanese Patent Application No. 63-194710 (laid open Aug. 11, 1988), states that alpha type manganese dioxide was tested and reported to be a better media for the removal of low levels (generally below the EPA limits) of contaminants from water than the media reported in the Imada patents.

The above prior art dealing with electrolytic manganese dioxide teaches that there must be a conversion from an initial complete gamma form to another form (beta plus gamma, beta alone or alpha alone), and that a microscopic pore structure must be converted to a macroscopic pore media.

U.S. Pat. Nos. 5,082,570 and 5,078,889 describe a manganese dioxide adsorption medium for heavy metals which is derived from electrolytic manganese by a sequence of comminuting, sizing, neutralizing, washing and drying steps. This material appears to have a capacity for lead which approaches that of colloidal hydrous manganese dioxide with a reported capacity of 0.65 milligrams of lead absorbed per gram of medium. The material, however, still has problems. The problems include a bleed off of extremely fine suspended solids in the early stages of use, a low capacity, and reproducibility of performance.

There is, accordingly, a continuing need for a water filtration medium that exhibits a higher adsorptive capacity for drinking water contaminants, especially lead; a reduction in bleeding and solubility in the initial exposures; a more reproducible performance; the ability to use a wider range of particle sizes of manganese dioxide; a more effective oxidation of iron, manganese, and hydrogen sulfide; and a more effective oxidation of organics.

SUMMARY OF THE INVENTION

The present invention is directed to the several shortcomings and problems described above. In a general aspect, the invention concerns a water treating agent which comprises particles of manganese dioxide derived from electrolyte manganese dioxide (EMD). EMD is generally accepted to be a gamma form of manganese dioxide in a very pure state.

The treating agents of the invention are formed from particles of EMD falling within the range between 10 and 325 mesh sizes. The range of particle sizes for any particular agent may vary within this broad range. In that regard, three ranges within the broad range are preferred for particular applications, based largely on experience. These preferred ranges are 10–40, 40–100 and 100–325. Thus, a preferred range for water containing heavy metals such as lead and manganese has been 40–100. This and other ranges are conveniently obtained by crushing and grinding EMD and screening the resulting ground product.

Having selected a starting material of a particular range of particle sizes, the material is treated with an aqueous solution of ferrous ions, preferably ferrous sulfate, a byproduct of which is the oxidization of the ferrous iron to ferric iron. The particles are then washed to remove any precipitated iron and fines. The washed particles are then treated with a solution of sodium hydrosulfite and sodium bisulfite in order to stabilize the surface to a more functional physical configuration. The particles are next treated with an alkaline solution, preferably sodium hydroxide, to neutralize the particles. The particles are then washed again in order to remove dissolved manganese and spent chemicals, following which they are dried.

Two especially important steps in the above sequence of steps involve the treatments with ferrous ions, and the treatment with sodium hydrosulfite and sodium bisulfite. The former step forms ferric ions which enter into the matrix of the crystalline EMD; and the latter step solubilizes or otherwise removes iron and manganese which are not integral parts of the crystalline EMD. These steps help to account for improved adsorptivity of heavy metals, greater bleed resistance, and increased pore structure and surface area.

DESCRIPTION OF THE PREFERRED EMBODIMENTS

Figure 1:
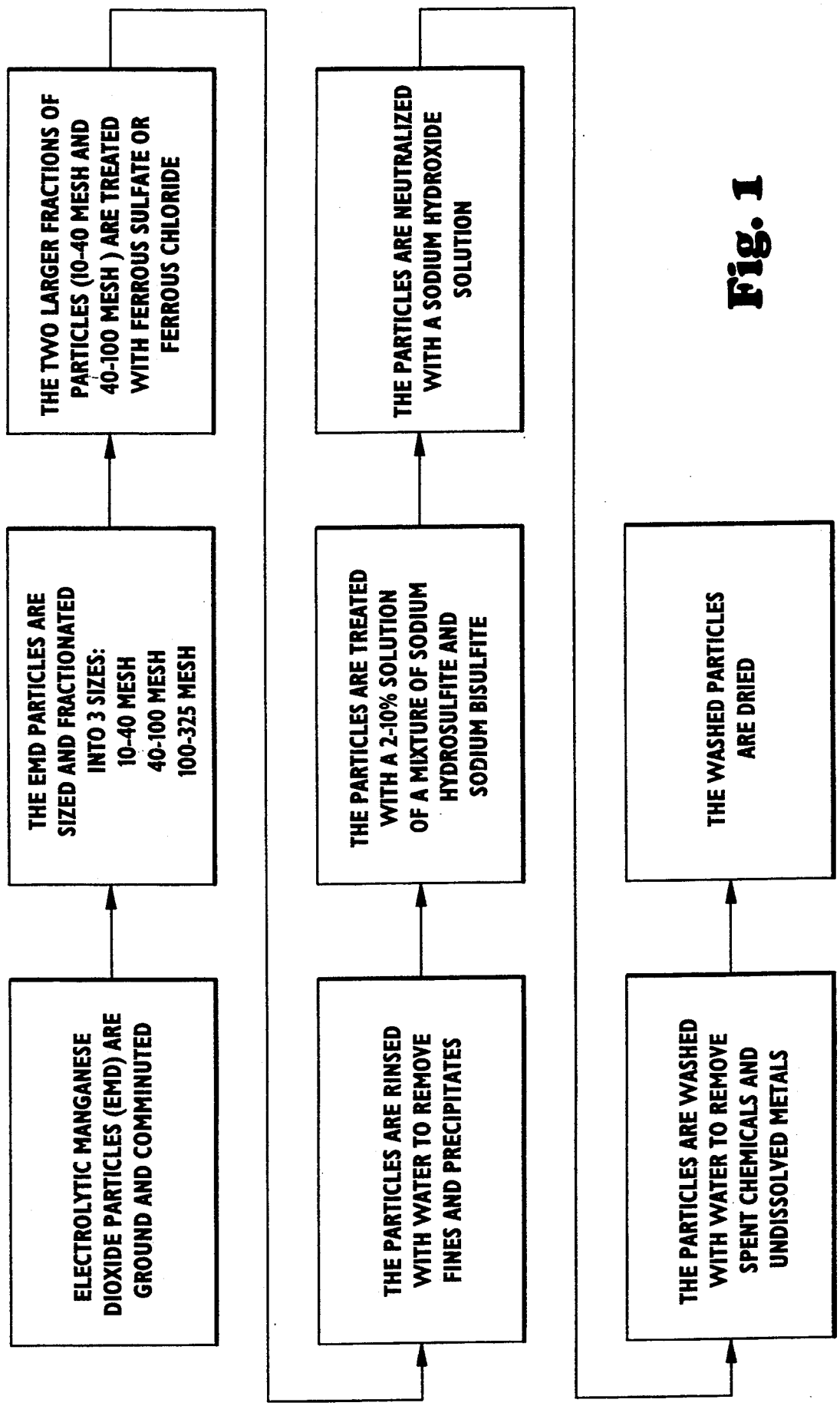
FIG. 1 is a schematic flow chart of the operations involved in a preferred embodiment of the invention.

The stability or inertness of manganese dioxide ($MnO_2$) in a severe chemical environment may be noted from its behavior in nature. Geologically deep beds of quite pure manganese dioxide, $MnO_2$ (80%), were formed from low grade ore over millions of years. Bulk components like silica, iron, aluminum, calcium, magnesium, etc., were slowly leached away leaving the more stable $MnO_2$ minerals as the residual product.

In addition to its inherent stability (i.e., will not leach into potable water), natural manganese dioxide deposits demonstrate a special affinity for certain metals in nature. For example, cobalt is highly enriched in ocean sea nodules, and certain manganese ores are mined primarily for their silver. However, this natural manganese dioxide is ineffective as a media for treating water due to the natural "loading" of the deleterious elements.

Very high purity, low cost $MnO_2$ has recently become commercially available as a bulk raw material in the form of electrolytic manganese dioxide (EMD). The electrolytic cell process for making EMD is relatively standard worldwide. There are many industries which produce the product, each with special product quality characteristics. Very high grade ore of 40% to 50% manganese in the form of $MnO_2$ (pure $MnO_2$ is 63% manganese) is first ground and fed to a high temperature reduction furnace with coke or methane ($CH_4$). The MnO which is formed in these furnaces is solubilized in sulfuric acid. This crude manganous sulfate ($MnSO_4$) solution is treated with hydrogen sulfide to precipitate out trace metals. The resulting purified ($MnSO_4$) solution is finally fed to one electrolytic cell to form manganese metal or to another cell at different operating conditions to make EMD. The subject media has, therefore, been both chemically and electrolytically purified.

The above process results in the formation of gamma-form EMD, which is a form of manganese dioxide that is used mainly as a depolarizer in common batteries to extend shelf life. This extended shelf life is due principally to the very low level of trace metal contaminants that result from the electrolytic process. The EMD is in a hard granular form as produced, often in "chips" of 1–3 inches. For battery use, the EMD is ground to a very fine powder. Also, this product is very acidic (pH 1–2) due to the sulfuric acid of the process. Neither of these characteristics are useful in the treatment of water for satisfactory contaminant removal and media regeneration.

Electrolytic manganese dioxide is typically not available in the particle sizes employed in the present invention. Therefore, it is generally necessary to grind the EMD to include three particle size ranges: 10–40, 40–100, and 100–325 U.S. STD sieve sizes (ranges are defined as the media that passes through a U.S. STD sieve no. 10 and is retained on a U.S. STD sieve no. 40, etc.) The 10–40 and 40–100 sizes are especially preferred for the purposes of this invention. These two sizes are preferably processed separately.

The gamma EMD is first ground and then screened or otherwise fractionated into desired particle ranges, preferably including the 10–40 and 40–100 mesh sizes. The desired particle size fraction is then treated with ferrous ions in a mol ratio preferably between about 0.004 and 0.010 under conditions to oxidize the ferrous ions to the ferric state. This treatment is preferably carried out at between about 10° C. and 40° C., and for a time between about 5 minutes and 60 minutes. The ferrous ions are absorbed into the manganese dioxide crystalline matrix which increases adsorption capacity.

The soluble and suspended products of the reaction are rinsed with water to remove fines and precipitates.

The rinsed manganese dioxide particles are then washed with an aqueous solution of a mixture of sodium hydrosulfite and sodium metabisulfite. The proportions of the two sulfites may vary considerably. The purpose of this wash is to remove any residual soluble manganese, clean the particles, and increase the surface area of the particles.

The washed particles are then preferably treated with a solution of sodium hydroxide to neutralize the particles.

Next the particles are washed with water in order to remove the dissolved manganese and spent chemicals.

The particles are then dried before being used in a filtration device. The particles may be dried in either a rotary kiln or a calciner.

The water filtration medium of the present invention is extremely effective in removing iron, manganese, hydrogen sulfide, lead and other heavy metal and organic contaminants from water. The above metals and contaminants are removed by contacting the contaminated water with the particular filtration medium.

The material may be implemented for various uses, including, but not limited to: (a) removal of contaminants from well water; (b) point of use applications; (c) point of entry applications, and (d) industrial applications. The medium is typically housed in a disposable cartridge for point of use applications wherein no regeneration is performed. For point of entry applications, the medium is typically housed in a fiberglass tank and is used in conjunction with activated carbon. The medium typically has a 4–5 year life when used for point of entry applications. Additionally, the medium is useful in industrial applications. The medium is not housed in a disposable cartridge for industrial applications.

The smallest fraction of the manganese dioxide particles, 100–325 mesh, may be bound together into a porous pressed block, instead of placement into a disposable cartridge. The pressed block procedure of the smallest fraction avoids the necessity of treatment of the particles and thereby alleviates problems of bleeding of the fine particles. The contact material is filtered through the pressed block.

From the foregoing, it will be understood by those versed in the art that filtration media have been produced that are singularly of value in the treatment of many types of water. In some instances, the filtered material can be removed by simple backwashing. In most instances, the new EMD media have a capacity for a contaminant many times that of the various individual prior art materials used in the water purification. The EMD media or derivatives are bacteriostatic, i.e., they will not support the growth of bacteria. While specific metals have been listed as contaminants which are removed by the EMD media, these are not cited as a limitation of the EMD media but as an illustration of typical metals that may be removed from water solutions. Thus, the present invention is not to be limited by these illustrations of use but, rather, by the appended claims and their equivalents when read in light of this description of the invention.

What is claimed is:

1. A water filtration medium prepared by treating particles of manganese dioxide with a solution of ferrous ions; rinsing the treated particles with water; contacting the rinsed particles with a sodium hydrosulfite/sodium bisulfite solution to remove residual soluble managanese; adding sufficient alkaline solution to the contacted particles to neutralize remaining acidity, washing the neutralized particles, and drying the resulting washed particles.

2. The water filtration medium according to claim 1 wherein manganese dioxide particles are in the 40–100 mesh size range.

3. The water filtration medium according to claim 1 wherein manganese dioxide particles are in the 10–40 mesh size range.

4. The water filtration medium according to claim 1 wherein manganese dioxide particles are in the 100–325 mesh size range.

5. The water filtration medium according to claim 1 wherein the solution of ferrous ions comprises ferrous sulfate.

6. The water filtration medium according to claim 1 wherein the solution of ferrous ions comprises ferrous chloride.

7. The water filtration medium according to claim 1 wherein the sodium hydrosulfite/sodium bisulfite solution comprises a 2 to 10% solution of a mixture of sodium hydrosulfite and sodium bisulfite.

8. The water filtration medium according to claim 1 wherein the alkaline solution comprises a solution of sodium hydroxide.

9. The water filtration medium according to claim 1 wherein the neutralization is to a pH between about 6 and about 8.

10. The water filtration medium according to claim 1 wherein the drying is accomplished using a rotary kiln or calciner.

11. A water filtration medium for the removal of heavy metals and organic contaminants from ground water and surface supplies wherein: (a) particles of gamma form manganese dioxide, including particles ranging in size from 10 to 325 mesh, have been divided into fractions according to mesh size, said fractions including 10 to 40 mesh size, 40 to 100 mesh size, and 100 to 325 mesh size; (b) said particles have been treated with ferrous sulfate; (c) said treated particles have been washed with water to remove iron precipitates and fines; (d) said washed particles have been treated with about a 2 to 10% solution of a 50:50 weight mixture of sodium hydrosulfite and sodium bisulfite solution; (e) the treated particles have been neutralized with sodium hydroxide to remove any remaining acidity; (f) the neutralized particles have been washed with water to remove spent chemicals and undissolved metals, and (g) the washed particles have been dried.

12. A disposable water filtration cartridge comprising:
a housing; and
a water filtration medium, said water filtration medium comprises:
(a) particles of gamma form manganese dioxide, including particles ranging in size from 10 to 325 mesh, have been divided into fractions according to mesh size, said fractions including 10 to 40 mesh size, 40 to 100 mesh size, and 100 to 325 mesh size;
(b) said particles have been treated with ferrous ions;
(c) said treated particles have been washed with water to remove iron precipitates and fines;
(d) said washed particles have been treated with about a 2 to 10% solution of a 50:50 weight mixture of sodium hydrosulfite and sodium bisulfite solution;
(e) the treated particles have been neutralized with sodium hydroxide to remove any remaining acidity;
(f) the neutralized particles have been washed with water to remove spent chemicals and undissolved metals, and;
(g) the washed particles have been dried.

13. The disposable water filtration cartridge of claim 12 which further comprises granulated activated carbon.

14. A method of making a treating agent for removing heavy metal contaminants from water containing such contaminants, comprising the following steps:
(a) treating gamma dioxide with a particle size range of about 10 to 325 mesh with ferrous sulfate;
(b) washing the treated particles to remove fines;
(c) contacting the said washed particles with a sodium hydrosulfite/sodium bisulfite solution;
(d) neutralizing the contacted particles;
(e) washing the neutralized particles to remove spent chemicals and undissolved metals; and
(f) drying the washed, neutralized particles.

15. A method according to claim 14 wherein the washing in step (b) is accomplished with water.

16. A method according to claim 14 wherein the sodium hydrosulfite/sodium bisulfite solution is about a 2 to 10% solution of about a 50:50 weight mixture of sodium hydrosulfite and sodium bisulfite.

17. A method according to claim 14 wherein the neutralizing in step (d) is accomplished using a solution of sodium hydroxide.

18. A method according to claim 14 wherein the drying is accomplished in a rotary kiln or calciner.

19. A water filtration medium capable of removing lead from water comprising: (a) particles of gamma form manganese dioxide; (b) said particles have been treated with ferrous sulfate; (c) said treated particles have been washed with water to remove iron precipitates and fines; (d) said washed particles have been treated with about a 2 to 10% solution of a 50:50 weight mixture of sodium hydrosulfite and sodium bisulfite solution; (e) the treated particles have been neutralized with sodium hydroxide to remove any remaining acidity; (f) the neutralized particles have been washed with water to remove spent chemicals and undissolved metals, and (g) the washed particles have been dried.

20. The medium of claim 19, wherein the particles range in size between about 40 and 100 mesh.

21. The medium of claim 20, wherein the particles include between about 10 and about 20 percent of particles in size between about 80 and about 100 mesh.

22. The medium of claim 20, wherein the particles include between about 30 and about 60 percent of particles in size between about 60 and about 100 mesh.

23. The medium of claim 19, wherein the particles range in size between about 100 and about 325 mesh.

24. The medium of claim 23, wherein the particles are held together to form a porous body.

25. The medium of claim 23, wherein the particles are bound together into a porous pressed block.

26. A method of purifying water derived from ground water or surface supplies of heavy metals and organic contaminants which comprises the step of filtering the water through a filter medium, said filter medium prepared by
(a) treating particles of manganese dioxide with a solution of ferrous ions;
(b) rinsing the treated particles with water;
(c) contacting the rinsed particles with a sodium hydrosulfite/sodium bisulfite solution to remove residual soluble manganese;
(d) adding sufficient alkaline solution to the contacted particles to neutralize remaining acidity;
(e) washing the neutralized particles, and drying the resulting washed particles.

27. A disposable water filtration cartridge comprising:
a housing; and
a medium, said medium disposed within the housing, said medium comprising:
(a) particles of gamma form manganese dioxide ranging in size between about 40 and 100 mesh, (b) said particles have been treated with ferrous sulfate, (c) said treated particles have been washed with water to remove iron precipitates and fines, (d) said washed particles have been treated with about a 2 to 100% solution of a 50:50 weight mixture of sodium hydrosulfite and sodium bisulfite solution, (e) the treated particles have been neutralized with sodium hydroxide to remove any remaining acidity, (f) the neutralized particles have been washed with water to remove spent chemicals and undissolved metals, and (g) the washed particles have been dried.

28. A disposable water filtration cartridge comprising:
a housing; and
a medium, said medium disposed within the housing, said medium comprising: (a) particles of gamma form manganese dioxide, wherein the particles include between about 10 and about 20 percent of particles in size between about 80 and about 100 mesh, (b) said particles have been treated with ferrous sulfate, (c) said treated particles have been washed with water to remove iron precipitates and fines; (d) said washed particles have been treated with about a 2 to 10% solution of a 50:50 weight mixture of sodium hydrosulfite and sodium bisulfite solution, (e) the treated particles have been neutralized with sodium hydroxide to remove any remaining acidity, (f) the neutralized particles have been washed with water to remove spent chemicals and undissolved metals, and (g) the washed particles have been dried.

29. A disposable water filtration cartridge comprising:
a housing; and a
medium, said medium disposed within the housing, said medium
comprising:
(a) particles of gamma form manganese dioxide, wherein the particles include between about 30 and about 60 percent of particles in size between about 60 and about 100 mesh, (b) said particles have been treated with ferrous sulfate, (c) said treated particles have been washed with water to remove iron precipitates and fines, (d) said washed particles have been treated with about a 2 to 10% solution of a 50:50 weight mixture of sodium hydrosulfite and sodium bisulfite solution, (e) the treated particles have been neutralized with sodium hydroxide to remove any remaining acidity, (f) the neutralized particles have been washed with water to remove spent chemicals and undissolved metals, and (g) the washed particles have been dried.

30. A method of making a treating agent for removing heavy metal contaminants from water containing such contaminants, comprising the following steps:
(a) treating gamma dioxide with a particle size range of about 10 to 325 mesh with ferrous chloride;
(b) washing the treated particles to remove fines;
(c) contacting the said washed particles with a sodium hydrosulfite/sodium bisulfite solution;
(d) neutralizing the contacted particles;
(e) washing the neutralized particles to remove spent chemicals and undissolved metals; and
(f) drying the washed, neutralized particles.

31. The method according to claim 30 wherein the washing in step (b) is accomplished with water.

32. The method according to claim 30 wherein the sodium hydrosulfite/sodium bisulfite solution is about a 2 to 10% solution of about a 50:50 weight mixture of sodium hydrosulfite and sodium bisulfite.

33. The method according to claim 30 wherein the neutralizing in step (d) is accomplished using a solution of sodium hydroxide.

34. The method according to claim 30 wherein the drying is accomplished in a rotary kiln.

* * * * *